United States Patent

Lennox

[15] 3,695,550

[45] Oct. 3, 1972

[54] TAPE DRIVE SHUT-OFF

[72] Inventor: Thomas M. Lennox, Mentor, Ohio

[73] Assignee: Scanfax Systems Corporation, New York, N.Y.

[22] Filed: May 20, 1970

[21] Appl. No.: 39,013

[52] U.S. Cl. ................242/191, 200/61.02, 242/188

[51] Int. Cl......B65h 25/32, B65h 25/10, G11b 15/54

[58] Field of Search..............242/189, 190, 191, 188; 200/61.02; 250/233; 242/204

[56] References Cited

UNITED STATES PATENTS

| | | | |
|---|---|---|---|
| 3,141,625 | 7/1964 | Namenyi-Katz | 242/204 |
| 3,497,157 | 2/1970 | Hanes | 242/188 |
| 3,305,185 | 2/1967 | Tegu | 242/191 |
| 3,141,626 | 7/1964 | Hoskin | 242/191 X |
| 3,488,017 | 1/1970 | Schatteman | 242/191 |
| 3,140,359 | 7/1964 | Rupard | 242/188 X |
| 3,454,204 | 7/1969 | Fieldgate | 242/188 X |
| 1,747,895 | 2/1930 | Fulton | 242/191 |
| 1,971,191 | 8/1934 | Lord | 250/233 X |

FOREIGN PATENTS OR APPLICATIONS

| | | | |
|---|---|---|---|
| 998,468 | 7/1965 | Great Britain | 242/186 |

*Primary Examiner*—George F. Mautz
*Assistant Examiner*—Edward J. McCarthy
*Attorney*—Amster & Rothstein

[57] ABSTRACT

A tape drive shut-off mechanism and circuit for use in a tape recorder-reproducer system is described as including, in cooperation with means for reproducing the audio information from a master tape onto a "-slave" tape, a mechanism for sensing the completion of the winding of the master tape from its feed spindle to its take-up spindle. Also disclosed is a means for acquiring a signal from the aforementioned mechanism in response to the completion of winding and the use of such a signal in terminating the operation of a common drive motor for both the master tape and the "slave" tape. In this way, the "slave" tape winding is terminated in response to the termination of winding of the master tape.

5 Claims, 7 Drawing Figures

INVENTOR
Thomas M. Lennox
BY Amster & Rothstein
AMSTER & ROTHSTEIN
ATTORNEYS

PATENTED OCT 3 1972 3,695,550

INVENTOR
Thomas M. Lennox
BY Amster & Rothstein
AMSTER & ROTHSTEIN
ATTORNEYS

TAPE DRIVE SHUT-OFF

This invention relates primarily to tape recording systems and more particularly to a tape drive shut-off mechanism and circuit for use therewith in providing a termination of the winding operation of a "slave" tape in response to the run-out of the master tape.

The present invention is particularly useful with an apparatus and method for the preparation and transmission of audio information from an origin location to a first remote location (normally a library or other convenient depository), and then, in multiple copies of such audio information, the dissemination thereof to a plurality of further remote locations. To more particularly describe this method of information flow, the contemplated origin location is a recording studio with the necessary recording equipment for recording audio information onto master tapes. The audio information, which is recorded, may be in the form of a lecturer reading from a written manuscript, or the like. Following the recording of individual master tapes at the recording studio, the tapes are packaged in protective cassettes and placed in a convenient depository (such as a library) to reproduce the information of the master tapes onto so-called "slave" tapes. A recording system capable of accommodating at least one, and preferably more "slave" tapes in cassettes is provided for recording the program of a selected master tape at the depository (library). Such a system enables wide dissemination of audio information. The "slave" recordings are produced in cassettes and may then be reproduced and played back at further remote locations.

The invention, as described herein, is particularly useful in a recording system for producing multiple "-slave" tape recordings from a master at the library. It is convenient, during such production of "slave" tape recordings, that means be provided for accommodating "slave" tape lengths of differing magnitudes. In accordance with such accommodation, it is therefore necessary to coordinate the termination of "slave" tape winding with the termination of winding of the master tapes.

Accordingly, a primary object of the present invention is to provide means for accommodating master and "slave" tapes of different length is a system for reproducing the audio information of the master tape onto the "slave" tape.

A further object of the present invention is to provide means for sensing the completion of winding of the master tape onto its take-up spindle in a cassette, and for shutting off the drive for the master tape "slave" tapes in response thereto.

These and other objects of the present invention are accomplished in accordance with one illustrative embodiment of the present invention by a mechanism and circuit for terminating operation of a drive motor common to both the master tape winding mechanism and the "slave" tape winding mechanism. Such termination is controlled to occur only when the master tape is completely wound onto its take-up spindle. The mechanism of the present invention includes a rotating perforated disc, coaxial with the master tape take-up spindle and attached thereto so that at the conclusion of the winding sequence of the master tape, the master take-up spindle and the perforated disc stop rotating. The circuit for the present invention includes a sensor light and photocell arranged on either side of the perforated disc so that with appropriate circuit components, a stop signal is presented to the common drive motor for both the master and "slave" tape winding mechanisms when the perforated disc stops rotating. The circuit function is accomplished by circuit recognition of the difference between an a.c. signal (when the perforations are moving between the sensor light and photocell) and a d.c. signal (when the perforated disc is not rotating).

The above brief description, as well as further objects, features and advantages of the present invention will be more fully appreciated by reference to the following detailed description of the preferred, but nonetheless illustrative embodiment when taken in conjunction with the accompanying drawings, wherein.

Figure 1:
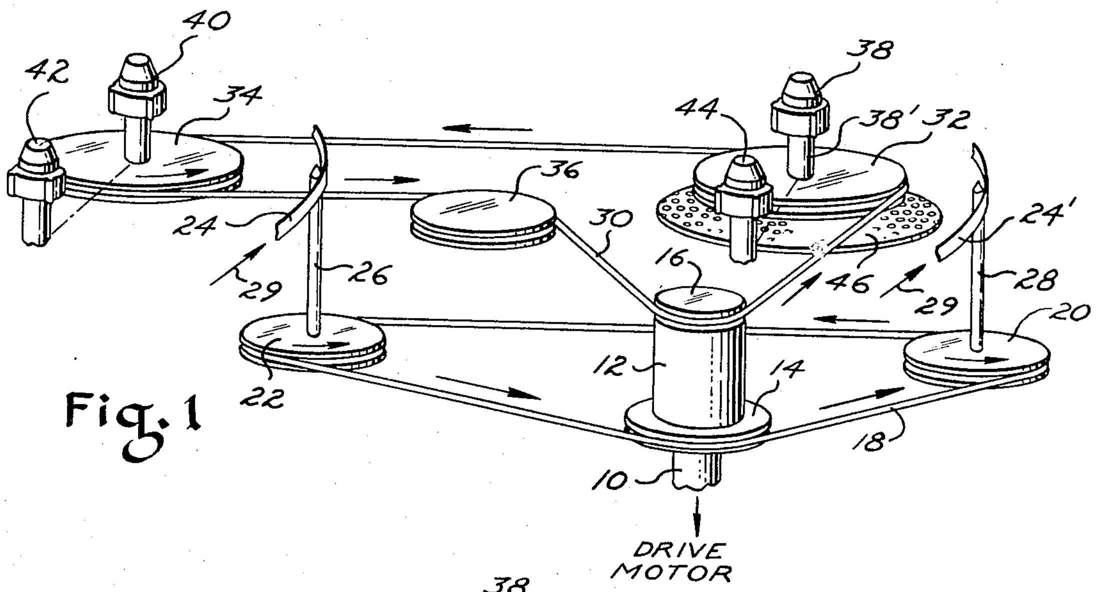
FIG. 1 is a perspective view of the drive mechanism for the master and "slave" winding mechanisms according to the present invention.

Referring to the drawings, and in particular FIG. 1, a typical pulley and belt drive system for use with a common drive motor for both master and "slave" take-up spindles is shown as including a drive motor shaft 10 coaxial with a drive pulley shaft 12, a capstan drive pulley 14 and a main drive pulley 16. A first belt 18 operatively connects the master capstan pulley 20 and the "-slave" capstan pulley 22. The pulley and belt system for belt 18 operates to rotate the various pulley members 14, 20, 22 in a counterclockwise direction. The tapes 24, 24' are thereby pulled by capstan shafts 26, 28 in directions 29 for both the "slave" and master tape drive mechanisms, respectively. The pulley and belt system for the second belt 30 includes the previously mentioned main drive pulley 16, the sensor pulley 32 and the "slave" pulley 34, all rotating in a counterclockwise direction in cooperation with an idler pulley 36 for driving the master take-up spindle 38 and the "-slave" take-up spindle 40, also in a counterclockwise direction. The mechanism is therefore operative to move the tape 24 from "slave" feed spindle 42 to "-slave" take-up spindle 40, with spindle 40 being the drive member and spindle 42 rotating under the action of the tape being pulled to the take-up spindle. The master take-up spindle 38 and feed spindle 44 operate in a similar manner to move tape 24' to unwind from spindle 44 and wind onto spindle 38.

Figure 2:
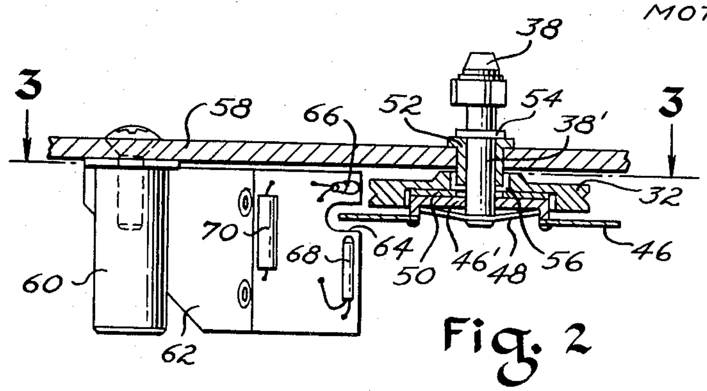
FIG. 2 is a side, sectional view of a part of the master winding mechanism, showing particularly the perforated disc and sensor circuit board according to the present invention.

As shown in FIG. 2, particularly, a perforated disc 46 is located coaxially with the master take-up spindle 38 and the sensor pulley 32. The disc 46 is attached to the master take-up spindle shaft 38' by means of tension spring 48, which also serves to urge the sensor drive plate 46' into frictional engagement with felt clutch 50.

The felt clutch 50 is located between the pulley 32 and the sensor drive plate 46' in such a manner that it acts as a clutch for the sensor pulley 32. While tape is still winding onto master take-up spindle 38, the perforated disc 46 continues to rotate along with the sensor pulley 32. When the winding is completed such that all of the master tape is wound on spindle 38 and the spindle 38 stops under the urging of the tape 24' being attached to master feed spindle 44, the felt clutch 50 operates as a clutch to insure the continued rotation of sensor pulley 32. The termination of rotation for the perforated disc 46 and the master take-up shaft 38' is also provided by such completion.

Other features of the clutching and drive mechanism for the master take-up spindle include bushing 52 and washer 54 for preventing downward movement of the shaft 38' and thrust bearing 56 for preventing any upward movement of the pulley 32 during operation. The bushing 52 also serves to rotatably attach the shaft 38' to operational panel 58. Also attached to the operational panel 58 is a circuit board mounting post 60 for mounting sensor board 62 in operational relationship with the perforated disc 46. It may be seen, particularly in FIG. 2, that the sensor circuit board 62 defines a notch 64 for facilitating rotation of perforated disc 46 between sensor light 66 and photocell 68, which are mounted on the circuit board 62. Also mounted on the circuit board 62 is a resistor 70, which cooperates with the photocell 68 in accomplishing the objectives of the present invention.

Figure 4:
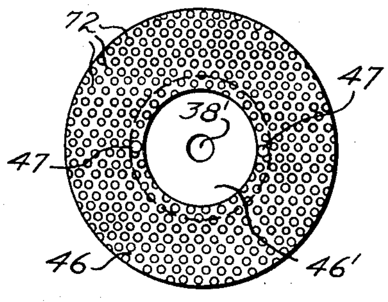
FIG. 4 is a top view of a perforated disc according to the present invention.
Figure 3:
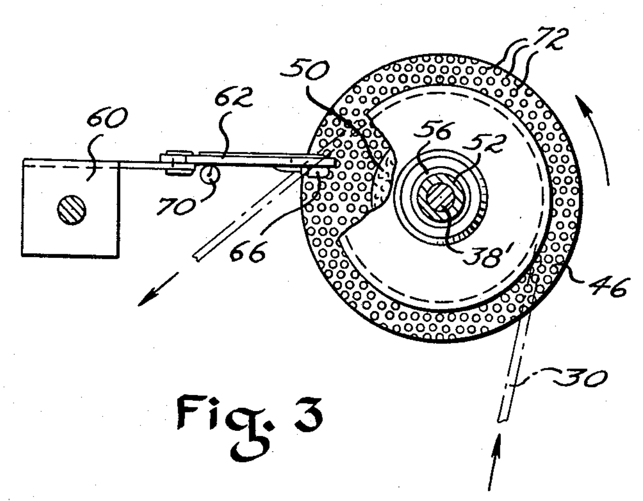
FIG. 3 is a top sectional view taken along the line 3—3 of FIG. 2 and in the direction of the arrows.
Figure 5:
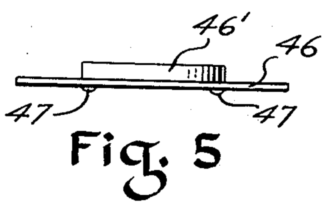
FIG. 5 is a side view of the perforated disc of FIG. 4.
Figure 6:
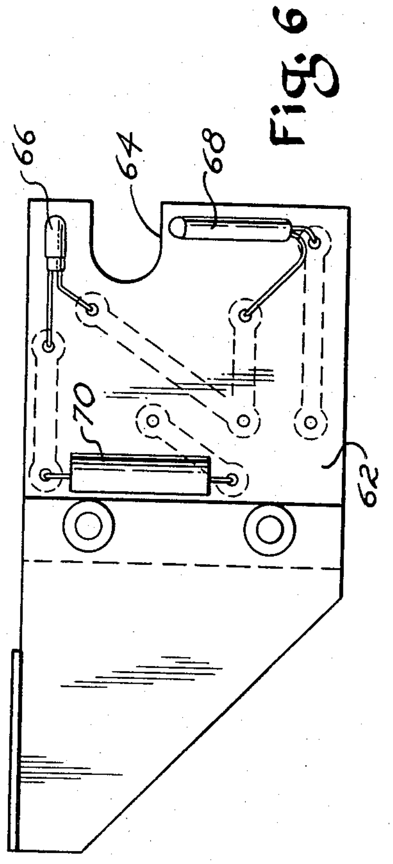
FIG. 6 is an exploded view of the sensor circuit board according to the present invention.

Referring to FIGS. 3, 4 and 5, the perforated disc 46 is shown in greater detail to include drive screws 47 for attaching sensor drive plate 46' to the perforated disc 46. Also, as seen by those drawings, the perforated disc 46 is constructed to define perforations 72 which rotate between the sensor light 66 and the photocell 68 such that an a.c. signal is imparted to the photocell 68 when the tape 24' is still unwinding from the master feed spindle 44 onto the master take-up spindle 38. When the winding operation has been completed for the master tape 24', a d.c. signal will be imparted to the photocell 68. It is contemplated that the rotation of the perforated disc 46 will be with a sufficient velocity to avoid confusion by the photocell between ambient light frequency (60 cycles) and the frequency of light imparted to the photocell by means of motion of the perforations 72 in the notch 64 of the circuit board 62.

Figure 7:
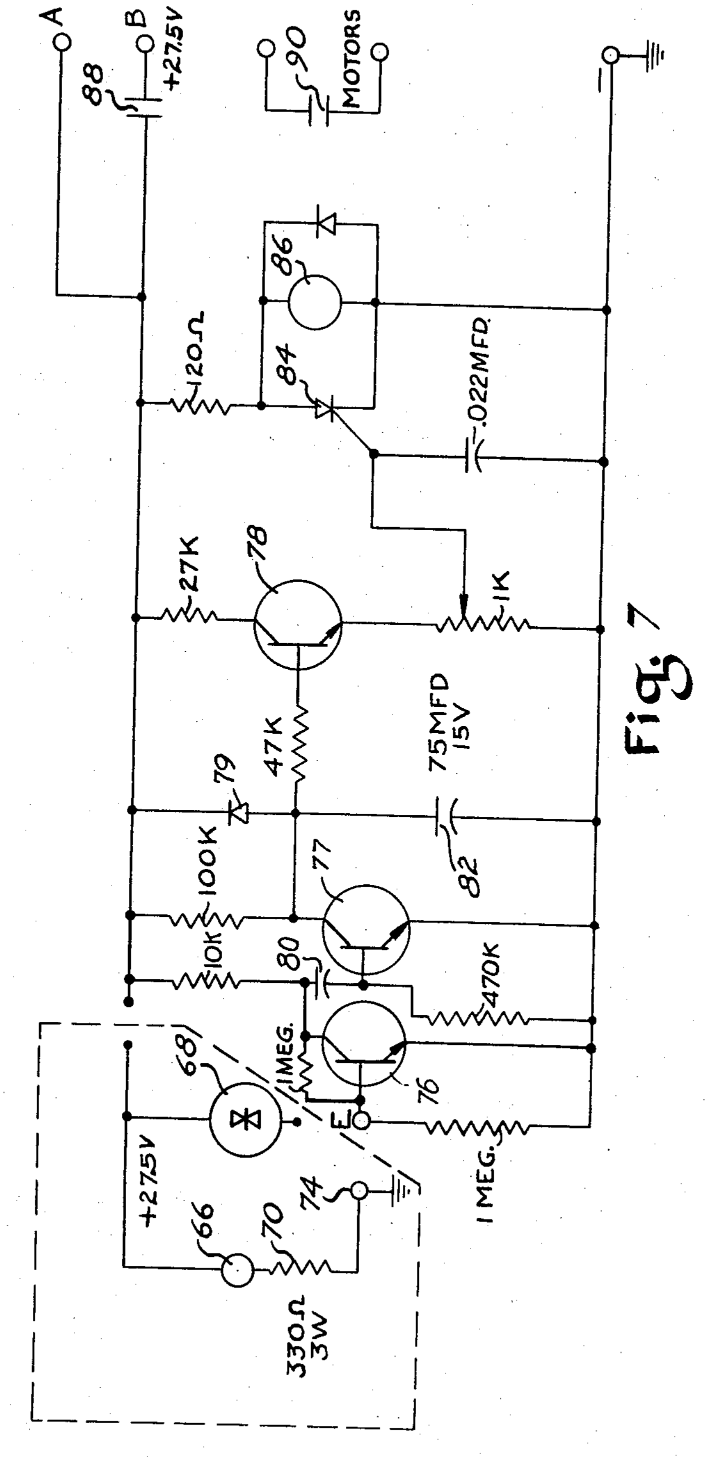
FIG. 7 is a schematic circuit diagram of a sensor circuit according to the present invention.

A more complete understanding of the operation of the present invention may be had by particular reference to FIG. 7, wherein a sensor circuit for the system is illustrated in schematic form. The circuit includes the sensor light 66 in series with resistor 70 and appropriate supply terminals 74 for the light. By way of example only, it is suggested that a 27 volt supply be used with a 5 volt sensor light and a 330 ohm resistor. The photocell 68 is used with a circuit that includes transistors 76, 77 78 and capacitors 80, 82. Also included in the circuit are silicon controlled rectifier 84 and relay 86, the relay 86 having relay contacts 88, 90 which are connnected respectively to a "start" switch for the entire recording system and the power supply to the drive motor for the "slave" and master tape winding mechanisms. In more detail, terminal A is connected to the "start" switch such that upon initiation of a reproduction operation for transferring the audio information of the master tape onto the "slave" tape, a signal flows to the relay 86 instantaneously and the relay contacts 88 and 90 are closed. Power is thereafter supplied directly from the power supply through connector B to maintain the relay 86 in energized condition. When the master tape runs out from the master feed spindle, the master take-up spindle stops rotating and therefore the perforated disc 46 also stops rotating. The photocell 68 then sees a d.c. signal (rather than an a.c. signal) which makes transistor 77 non-conducting and charges up capacitor 82, which discharges to turn on transistor 78. The silicon controlled rectifier 84 is fired up to short the relay 86, the relay contacts 88 and 90 open so that the drive motors are turned off, the "-start" switch is reset, and the sensor light 66 is turned off.

In order to facilitate a more thorough understanding of the present invention, a typical sequence of operations will now be described. The record-reproduce sequence for recording the audio information of the master tape 24' onto the "slave" tape 24 is commenced by actuating the "start" switch (not shown), which sends power from terminal A into the circuit of FIG. 7 sufficient to energize the relay 86 and cause power to flow form terminal B through the closed relay contact 88 to the circuit. This power from terminal B maintains the relay 86 in an energized condition and likewise maintains the relay contact 90 in a closed condition. Power from the drive motors rotates the master take-up spindle 38 in a counterclockwise direction and also causes rotation of the capstan shaft 28. Since both "-slave" and master mechanisms use a common drive motor, the "slave" take-up spindle 40 and the capstan shaft 26 for the "slave" tape 24 also rotate in a counterclockwise direction. Since the take-up spindle 38 is rotating, the perforated disc 46 rotates in the notch 64 between now-illuminated sensor light 66 and photocell 68. An a.c. signal is thereby provided to the circuit of FIG. 7 such that the transistor 77 conducts to prevent a voltage buildup across capacitor 82. The transistor 78 is thereby rendered non-conducting and the silicon controlled rectifier 84 is negative and off, which prevents a short of the relay 86. The contacts 88 and 90 for the relay are thereby closed.

Upon cessation of the winding of master tape 24' onto spindle 38 (when it is completely rewound from said spindle 44), the pulley 32 will continue rotating and the perforated disc 46 will immediately stop. Stopping the rotation of perforated disc 46 provides a d.c. rather than an a.c. signal to the circuit of FIG. 7, thereby rendering transistor 77 non- conducting and providing a voltage build-up across capacitor 82. The transistor 78 is turned on by the discharge from capacitor 82 to fire the silicon controlled rectifier, which in turn provides a shorting path for the relay 86. The relay 86 is de-energized so that relay contact 90 opens to terminate power for the drive motor and relay contact 88 also opens to reset the "start" switch for the system and to shut off the sensor light 66. The remaining energy in capacitor 82 is discharged through diode 79 back through the circuit of light 66 to ground to reset the circuit.

By such means as are shown and described, an automatic drive motor termination mechanism and circuit are provided to insure instantaneous cessation of "- slave" take-up spindle rotation upon complete unwinding of the master tape from its feed spindle. Recommended values for a typical circuit useful for the present invention are noted on the drawing of FIG. 7 and it is to be understood that both a common drive motor for master and "slave" take-up spindles and capstan shafts, and separate drive motors therefor with a common power supply are contemplated. Likewise, if more than one "slave" recording mechanism is provided for use with a single master in the system, various arrangements in accordance with the above description are usable to cease operation of all "slave" tape winding mechanisms as soon as the master tape is completely wound on its take-up spindle.

What is claimed is:

1. A mechanism and circuit for use in cooperation with a drive motor for a recording system which records audio information from a master tape onto a "-slave" tape, said mechanism and circuit terminating operation of said drive motor in response to completion of winding of said master tape onto a rotatable master take-up spindle, comprising light responsive means for sensing said completion of winding, said light responsive means including a sensor light, a photocell and a rotatable perforated disc coaxial with said master take-up spindle, the disc rotation terminating upon termination of rotation of said spindle, and circuit means for terminating operation of said drive motor in response to said completion of winding, said circuit means including first switch means, said first switch means being rendered conductive in response to an AC signal being provided to said first switch means by rotation of said rotatable perforated disc between said sensor light and said photocell and said first switch means being rendered non-conductive in response to a DC signal being provided to said first switch means upon termination of rotation of said rotatable perforated disc.

2. The invention according to claim 1 further including second switch means being rendered non-conductive in response to said first switch means being rendered conductive and said second switch means being rendered conductive in response to said first switch means being rendered non-conductive.

3. The invention according to claim 2 wherein said sensor light and photocell are mounted on a circuit board, said circuit board defining a notch between said sensor light and said photocell, and part of said rotatable disc being rotatable in said notch.

4. The invention according to claim 3 wherein the plane of said circuit board is generally perpendicular to the plane of said rotatable disc.

5. The invention according to claim 2 wherein a clutch mechanism is provided coaxially with said spindle, and a belt is provided to rotate said spindle in response to operation of said drive motor, said belt also providing motion to said "salve" tape in response to said drive motor, and said spindle rotation being separable from motion of said belt by means of said clutch mechanism.

* * * * *